United States Patent
Okubo et al.

(10) Patent No.: US 6,949,023 B1
(45) Date of Patent: Sep. 27, 2005

(54) GAME MACHINE AND INFORMATION STORAGE MEDIUM

(75) Inventors: Hiroshi Okubo, Yokohama (JP); Toshiyuki Koike, Kawasaki (JP); Yutaka Ito, Yokohama (JP); Tetsukazu Nakanishi, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/555,630

(22) PCT Filed: Oct. 1, 1999

(86) PCT No.: PCT/JP99/05418

§ 371 (c)(1),
(2), (4) Date: Jul. 6, 2000

(30) Foreign Application Priority Data

Oct. 7, 1998 (JP) .......................... 10-300439

(51) Int. Cl.[7] .............................. A63F 13/00
(52) U.S. Cl. ......................... 463/30; 463/43
(58) Field of Search ..................... 463/30, 43

(56) References Cited

U.S. PATENT DOCUMENTS

| | | | | |
|---|---|---|---|---|
| 5,233,576 A | * | 8/1993 | Curtis et al. ............. | 369/13.02 |
| 5,506,932 A | * | 4/1996 | Holmes et al. | |
| 5,652,627 A | * | 7/1997 | Allen ......................... | 348/497 |
| 5,668,601 A | * | 9/1997 | Okada et al. .......... | 375/240.25 |
| 5,687,160 A | * | 11/1997 | Aotake et al. ........... | 369/275.3 |
| 5,732,067 A | * | 3/1998 | Aotake ..................... | 369/275.3 |
| 5,809,203 A | * | 9/1998 | Hwangbo .................... | 386/70 |
| 5,854,873 A | * | 12/1998 | Mori et al. | |
| 5,889,515 A | * | 3/1999 | McDade et al. ......... | 715/500.1 |
| 5,907,658 A | * | 5/1999 | Murase et al. | |
| 5,923,869 A | * | 7/1999 | Kashiwagi et al. | |
| 6,041,067 A | * | 3/2000 | Takamori et al. | |
| 6,148,138 A | * | 11/2000 | Sawabe et al. ............... | 386/69 |
| 6,222,806 B1 | * | 4/2001 | Mori et al. ............... | 369/53.32 |
| 6,226,247 B1 | * | 5/2001 | Sako et al. ............... | 369/53.31 |
| 6,339,675 B1 | * | 1/2002 | Shimizu et al. ............... | 386/98 |
| 6,374,037 B1 | * | 4/2002 | Okada et al. ................. | 386/95 |
| 6,414,996 B1 | * | 7/2002 | Owen et al. ........... | 375/240.17 |
| 6,535,467 B1 | * | 3/2003 | Jung et al. ............... | 369/47.16 |
| 6,594,442 B1 | * | 7/2003 | Kageyama et al. ........... | 386/96 |

FOREIGN PATENT DOCUMENTS

| | | |
|---|---|---|
| JP | U-3-83587 | 8/1991 |
| JP | A-6-161348 | 6/1994 |
| JP | A-6-195953 | 7/1994 |
| JP | A-10-258181 | 9/1998 |

* cited by examiner

Primary Examiner—Michael O'Neill
(74) Attorney, Agent, or Firm—Oliff & Berridge, PLC

(57) ABSTRACT

The objective of the present invention is to provide a game machine, a musical tone generation device, and an information storage medium that make it possible to synchronize reproduced sounds and images, even if faults such as skips in those sounds or images occur during the reproduction of sounds and images that have been recorded on optical disk. When a game computation section (30) in this game machine instructs the reproduction of given sound data that has been recorded on an optical disk, based on the game state, sound data (96) that has been read from an optical disk (90) is reproduced by a sound reproduction section (60) and is output to a sound output section (80). During this time, a synchronization processing section (40) performs processing to obtain synchronization with the reproduced sounds, based on synchronization data that was read in together with the sound data, and instructs the images to be reproduced by an image generation section (50) and also the timing at which images are switched. Since image reproduction is based on instructions from the synchronization processing section (40) in this manner, the images can be reproduced in synchronization with the reproduced sounds.

35 Claims, 9 Drawing Sheets

250 CD
260 CD-ROMXA-FORMAT DATA (SOUND DATA AND SYNCHRONIZATION DATA)
270 CD-ROM-FORMAT DATA (SUCH AS GAME PROGRAM AND GAME DATA)

AN: n-CHANNEL ADPCM SECTOR
D: DATA SECTOR

FIG.6

| | 510-1 | 510-2 | 510-3 | 510-4 |
|---|---|---|---|---|
| DISPLAY IMAGE | ● | ◆ | ▲ | X |
| IMAGE NUMBER | 0 | 1 | 2 | 3 |
| ELAPSED TIME OF TUNE | LESS THAN 0 TO 10 SEC | LESS THAN 10 TO 20 SEC | LESS THAN 20 TO 30 SEC | LESS THAN 30 TO 40 SEC |

GAME MACHINE AND INFORMATION STORAGE MEDIUM

TECHNICAL FIELD

The present invention relates to a game machine, a musical tone reproduction device, and an information storage medium that reproduce sounds and images that have been recorded on an optical disk.

BACKGROUND OF ART

To increase the interest and degree of excitement of a game produced by a game machine, game images are switched or certain of their attributes such as their color are changed in time with game music, or the controller or the seat in which the player is sitting is made to vibrate.

In such a case, game sounds that are stored on an optical disk such as an ordinary compact disk are reproduced independently of the execution of the game program. To enable this in the conventional art, the time from the start of reproduction of the game sounds is obtained by counting from the game program side during the reproduction of game sounds from the compact disk, and images are generated in synchronization with the game sounds.

However, in such a method, when a fault such as sound skipping occurs during reproduction from the compact disk, that fault will not be reflected in the program counter and it will no longer be possible to synchronize the program counter and the game sounds. This causes a problem in that slippage will occur in images that ought to be generated in synchronization with game sounds.

DISCLOSURE OF INVENTION

The present invention was devised in the light of the above described technical problem, with the objective of providing a game machine, a musical tone generation device, and an information storage medium that make it possible to synchronize reproduced sounds and images, even if faults such as skips in those sounds or images occur during the reproduction of sounds and images that have been recorded on optical disk.

1) A game machine in accordance with an aspect of the present invention comprises: an optical disk in which is included synchronization data for synchronizing with at least one of sound data and image data, within at least one of the sound data and image data; reproduction means for reproducing at least one of a sound and an image, based on at least one of the sound data and the image data accessed from the optical disk; and processing means for executing given processing in synchronization with at least one of sounds and images to be reproduced by reproduction means, based on synchronization data accessed from the optical disk.

In this case, sound data includes data such as musical tone data on tunes used in a game, by way of example.

This optical disk comprises media such as a CD, LD, MD, or DVD.

With a processing means that performs given processing, it is generally difficult to detect sound skipping, even if a fault such as sound skipping should occur during the reproduction of sounds from an optical disk.

However, the present invention makes it possible to receive synchronization data that is accessed from the optical disk together with the reproduction of musical tones of a tune used in the game, for example, and perform given processing in synchronization with at least one of sounds and images to be reproduced by reproduction means, based on that synchronization data. For that reason, it is possible to synchronize or recover synchronization based on that synchronization data to perform various types of processing, even if sound skipping or image skipping occur in sounds and images reproduced from the optical disk.

Recovery of synchronization means that synchronization can be recovered immediately by the synchronization data, if a fault such as sound skipping occurs so that there is a discrepancy in processing with respect to the sound.

The synchronization data includes data indicating elapsed time since the start of the tune, data indicating a position or a delimiter of the tune, timing data determined in accordance with the rhythm, tempo, or beat of the tune, or counter data, by way of example.

The synchronization data is preferably comprised at a constant spacing.

In addition, the optical disk is preferably a compact disk. The compact disk in this case is formatted in such a manner that it can be read by a game machine, such as a CD-ROM. To ensure that the sound data or image data for reproduction is processed simultaneously with the synchronization data in the game machine, it is preferable that this CD-ROM conforms with CD-ROMXA standard. Conformity with CD-ROMXA standard permits computer data to be interleaved with other data, such as audio data, so that the computer data and the audio data can be reproduced consecutively. In principle, computer data is allocated to empty areas by compressing the sound data.

In a game machine using musical tones for tunes and image data, to be used in a game stored on a compact disk such as a CD-ROM, it is possible to obtain synchronization or recover such synchronization with the sounds and images that are reproduced from the compact disk, and perform image generation, even if sound skipping or image skipping occurs in the sounds and images reproduced from the compact disk.

2) In the game machine of the present invention, at least one item of the synchronization data may be included within a range of data that is capable of being accessed simultaneously.

In the present invention, it may be possible to achieve more accurate synchronization, because the synchronization data is always included within each range of data that can be accessed at a time. This also makes it possible to recover the synchronization more rapidly 3) In the game machine of the present invention, the synchronization data may comprise data indicating at least one of elapsed time since reproduction start during normal reproduction and elapsed time from a predetermined position.

When synchronization with game music is done by an ordinary game program, the decision of the reproduction position of the tune is often done at a certain elapsed time since reproduction start or elapsed time from a predetermined position. The predetermined position could be a tune delimiter, by way of example. When sound skipping occurs in such a case, the program count will deviate from the tune reproduction, leading to a loss in synchronization.

In the present invention, however, it may be possible to obtain an accurate tune reproduction position, by the game program referencing the synchronization data. Therefore, even if sound skipping occurs in the sound that is being reproduced from the optical disk, it is possible for the processing means to execute processing to obtain accurate synchronization or recover that synchronization with the sounds reproduced from the optical disk.

4) The game machine of the present invention may further comprise a display section for displaying a game image, and the processing means may perform image generation processing on a game image to be displayed on the display section, in synchronization with at least one of a sound and an image reproduced by the reproduction means, based on synchronization data of the optical disk.

The present invention can make it possible to obtain synchronization or recover the synchronization with sounds and images reproduced from the optical disk, even if sound skipping or image skipping has occurred, and perform image generation.

5) The game machine of the present invention may further comprise a game controller for inputting an operation by a player, and the processing means may perform processing for output to the controller, in synchronization with at least one of a sound and an image reproduced by the reproduction means, based on synchronization data of the optical disk.

The controller is a device that the player uses to perform input operations of the game, and resistive forces, vibrations or the like are output therefrom.

In the invention, it may be possible to obtain synchronization or recover the synchronization with sounds and images reproduced from the optical disk, even if sound skipping or image skipping has occurred, and output resistive forces, vibrations or the like to the controller.

6) The game machine of the present invention may further comprise at least one of a player platform on which a player rides and a seat on which a player sits, and the processing means may perform processing for output to at least one of the player platform and the seat, in synchronization with at least one of a sound and an image reproduced by the reproduction means, based on synchronization data of the optical disk.

A player platform is a game plate that resembles skis or a snowboard for a skiing game or snowboarding game, or a game housing that resembles a motorbike, racing bike, or horse for a motorbike, cycling, or horse-racing game, by way of example. Similarly, a seat on which a player sits is a driving seat for a driving game or the like, or a seat that moves together with a image for an adventure game, by way of example.

In the present invention, it may be possible to obtain synchronization or recover the synchronization with sounds and images reproduced from the optical disk, even if sound skipping or image skipping has occurred, and output vibrations or the like to a player platform on which the player rides or a seat on which the player sits.

7) The game machine of the present invention may further comprise an optical signal output section, and the processing means may perform processing for output an optical signal to the optical signal output section, in synchronization with at least one of a sound and an image reproduced by the reproduction means, based on synchronization data of the optical disk.

The optical signal output portion comprises an LED, operation indication bulb or the like provided outside the housing.

In the present invention, it may be possible to obtain synchronization or recover the synchronization with sounds and images reproduced from the optical disk, even if sound skipping or image skipping has occurred, and output an optical signal.

8) The present invention further relates to an optical disk that is readable by a game machine, the optical disk storing at least one of sound data and image data comprising synchronization data as defined by the present invention.

9) The present invention also relates to an information storage medium for reading data from an optical disk in which is included synchronization data for synchronizing with at least one of sound data and image data, within at least one of the sound data and image data, and performing given processing, the information storage medium comprising: information for reproducing at least one of a sound and an image, based on at least one of the sound data and the image data accessed from the optical disk; and information for executing given processing in synchronization with at least one of sounds and images to be reproduced by reproduction means, based on synchronization data accessed from the optical disk.

This optical disk and the information storage medium of the present invention could be the physically same medium. In other words, the optical disk could be configured to comprise data that is at least one of sound data and image data, and synchronization data included within that data, for obtaining synchronization with at least one of the sound data and image data; and also comprise information for accessing data from that optical disk and reproducing at least one of sounds and images, based on at least one of sound data and image data on the optical disk; and information for fetching synchronization data that has been accessed from the optical disk, for synchronizing with at least one of sounds and images to be reproduced, based on that synchronization data, and for performing given processing.

The information storage medium of the present invention preferably further comprises information for synchronizing with at least one of sounds and images to be reproduced, based on the synchronization data, and for performing image generation processing of game images to be displayed on a display section.

The information storage medium of the present invention preferably further comprises information for synchronizing with at least one of sounds and images to be reproduced, based on the synchronization data, and for processing sounds for output to the controller.

The information storage medium of the present invention preferably further comprises information for synchronizing with at least one of sounds and images to be reproduced, based on the synchronization data, and for processing outputs to at least one of the player platform and the seat.

The information storage medium of the present invention preferably further comprises information for synchronizing with at least one of sounds and images to be reproduced, based on the synchronization data, and for outputting optical signals to an optical signal output section.

10) In the information storage medium of the present invention, at least one item of the synchronization data may be included within a range of data that is capable of being accessed simultaneously.

11) In the information storage medium of the present invention, the synchronization data may comprise data indicating at least one of elapsed time since reproduction start during normal reproduction and elapsed time from a predetermined position.

12) The present invention still relate to a musical tone reproduction device comprises: an optical disk in which is included synchronization data for synchronizing with sound data, within the sound data; image data storage means in which is included image data; reproduction means for reproducing a tune, based on the sound data accessed from the optical disk; and image reproduction means for synchronizing with the tune to be reproduced, based on the synchronization data accessed from the optical disk, and for performing reproduction processing on an image that is stored in the image data storage means.

For example, when karaoke tunes are stored on an optical disk and background images for the karaoke are recorded on a storage medium that is separate from that containing the tunes, the present invention can make it possible to synchronize accurately or recover that synchronization with tunes reproduced from the optical disk, even if sound skipping of the tunes occurs, and to perform image reproduction processing.

13) In the musical tone reproduction device of the present invention, at least one item of the synchronization data may be included within a range of data that is capable of being accessed simultaneously.

14) In the musical tone reproduction device of the present invention, the synchronization data may comprise data indicating at least one of elapsed time since reproduction start during normal reproduction and elapsed time from a predetermined position.

15) The present invention still further relates to an information storage medium for reading data from an optical disk in which is comprised synchronization data for synchronizing with sound data, within the sound data, and performing given processing, the information storage medium comprising: information for reproducing a tune, based on the sound data accessed from the optical disk; and information for synchronizing with a tune to be reproduced by the reproduction means, based on the synchronization data accessed from the optical disk, and performing image reproduction processing.

16) In the information storage medium of the present invention, at least one item of the synchronization data may be included within a range of data that is capable of being accessed simultaneously.

17) In the information storage medium of the present invention, the synchronization data may comprise data indicating at least one of elapsed time since reproduction start during normal reproduction and elapsed time from a predetermined position.

BRIEF DESCRIPTION OF DRAWINGS

FIG. 6 is illustrative of display images that are displayed at tune delimiters every ten seconds;

BEST MODE FOR CARRYING OUT THE INVENTION

Preferred embodiments of the present invention are described below with reference to the accompanying drawings.

The characteristics of the present invention will first be described with reference to a conventional-art example, taking a case in which synchronization is obtained between sounds and images.

When game images are generated in synchronization with game sounds that are reproduced from a compact disk (hereinafter abbreviated to CD), by way of example, the reproduction position of the current game sound is obtained in the prior art by having the game program count at the same time that the reproduction starts. Thus, if some sort of fault should occur in the CD (due to shock, or the like), slippage will occur between the counter in the game program and the actual reproduction position.

Figure 1:
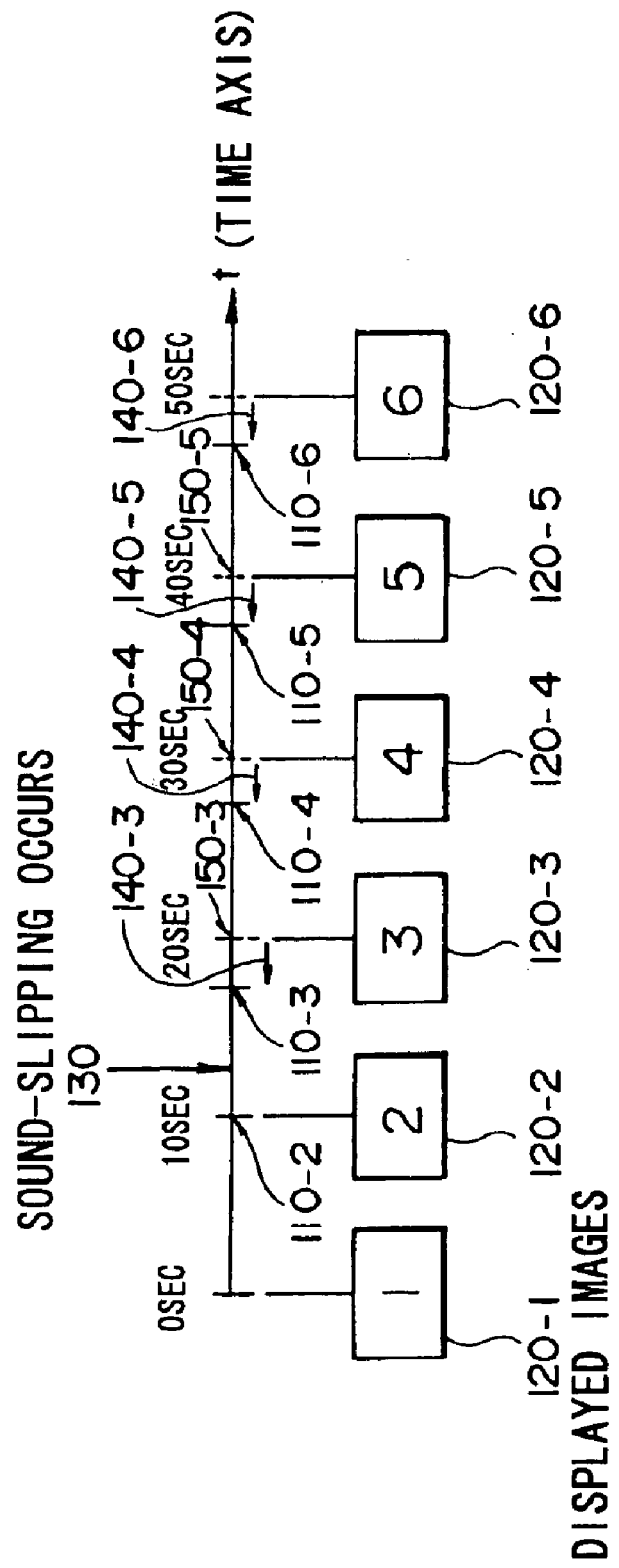
FIG. 1 is illustrative of slippage between game sounds and displayed images when sound skipping occurs in a conventional art system.

An illustration of slippage between game sounds and displayed images when sound skipping occurs in a conventional system is shown in FIG. 1. Actual time is denoted by time t and the counter of the game program is synchronized with this actual time. The description that follows concerns a situation in which the game music has tune delimiters at 10-second intervals and switching of displayed images is synchronized with these tune delimiters.

In such a case, if the count on the game program side starts at the same time that a tune starts and processing is done to switch the displayed image every 10 seconds, the displayed images ought to be switched every time there is a delimiter in the game music.

Assume, however, that a sound skip occurs between 10 seconds and 20 seconds after a tune starts, as shown in FIG. 1 (see reference number 130). In this case, tune delimiters that originally came after 10 seconds, 20 seconds, 30 seconds, etc. are generated at 110-2, 110-3, . . . and slippages (140-3, 140-4, . . .) are generated away from the game program counts (150-3, 150-4, . . .). Since the displayed images are switched in accordance with the game program counter, slipping will occur in the switching timing of the tune delimiters and the displayed images, and it will not be possible to recover from this slippage between game sounds and displayed images.

In contrast thereto, the method of the present invention makes it possible to design for rapid synchronization recovery if such sound skipping should occur. In accordance with the present invention, synchronization data is incorporated at a constant spacing within the sound data, making it possible to read the sound data and synchronization data at the same time. When synchronization is obtained between the game sounds and the displayed images, the images are switched on the basis of this synchronization data.

More specifically, synchronization data that can determine tune delimiters is inserted at positions that are read simultaneously with the sound data, for example. On the game program side, processing is done to switch the displayed image when synchronization data indicating such a tune delimiter is read.

Figure 2:
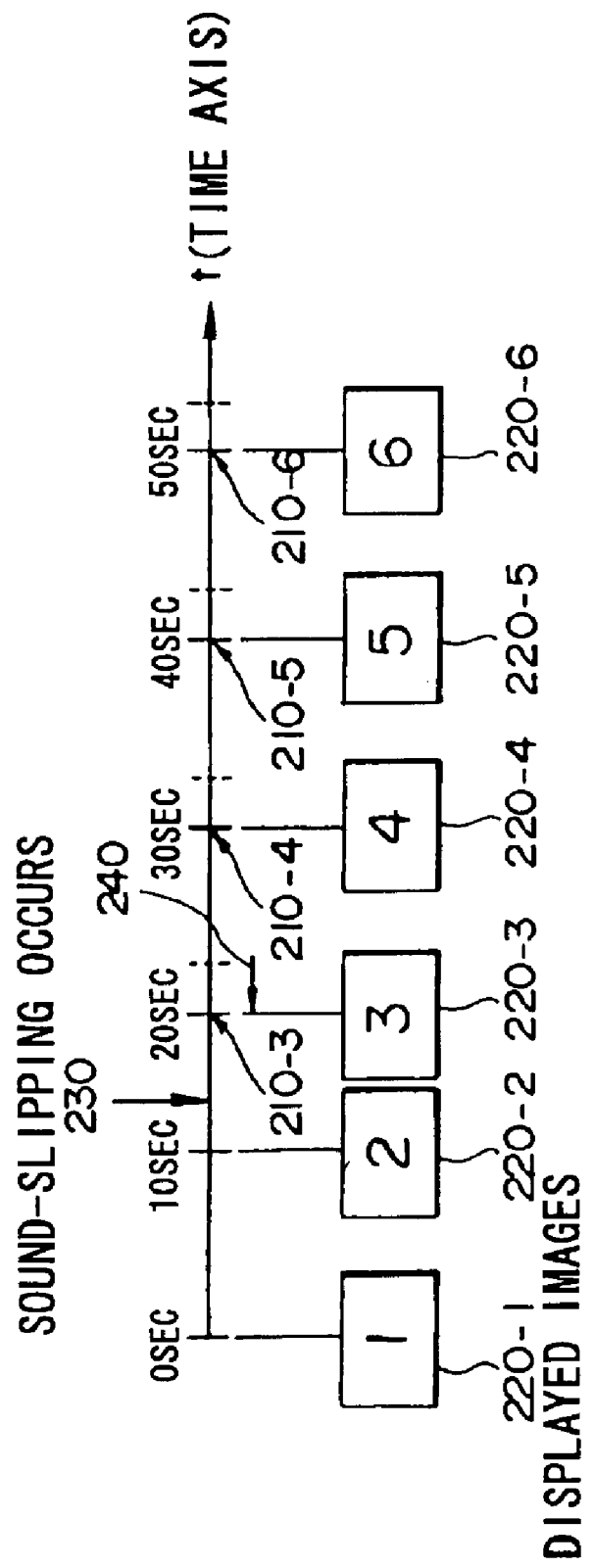
FIG. 2 is illustrative of an example of synchronization between game sounds and images when sound skipping has occurred, using the method of the present invention.

An illustration of the use of the method of the present invention, showing an example of the synchronization of game sounds and images when sound skipping has occurred, is shown in FIG. 2.

Assume that a sound skip occurs between 10 seconds and 20 seconds after a tune starts, in the same way as shown in FIG. 1 (see reference number 230). In the configuration of the present invention, synchronization data that indicates the tune delimiter that ought to be detected after 20 seconds from the tune start is detected at the point 210-3, which is earlier by amount of the sound slippage (see 240). The displayed images are switched at that point. It is therefore possible to switch the displayed images in complete synchronization with the tune delimiter 210-2, 210-3, . . . , even if sound skipping has occurred.

The description now turns to the format in which data is stored on a CD-ROMXA that is employed by this embodiment of the invention. The CD-ROMXA differs from an ordinary music CD in that sound data is stored thereon in a compressed form. Physical images of data stored on a CD are shown in FIGS. 3A and 3B.

Figure 3A:
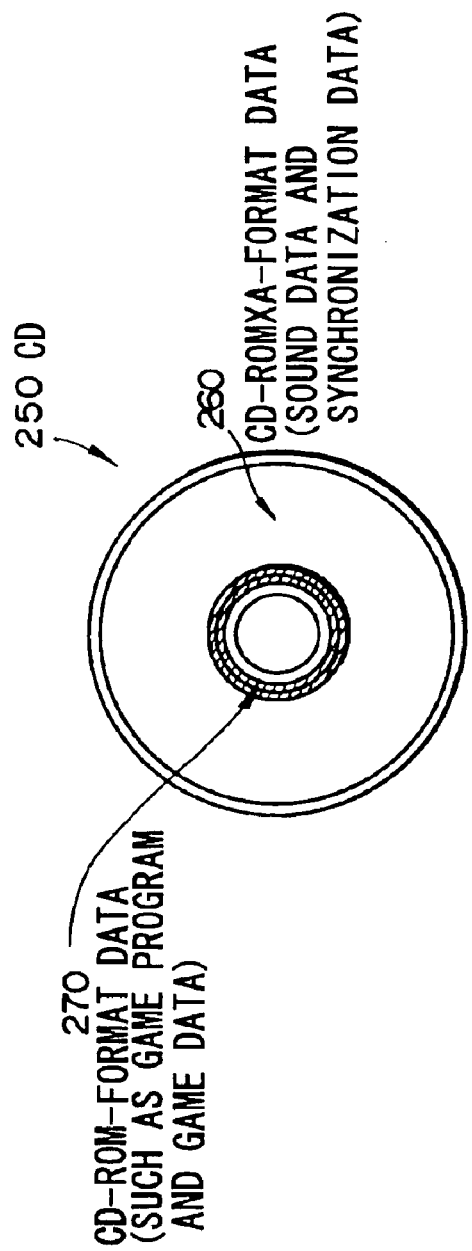
FIGS. 3A and 3B show physical images of data recorded on a CD.

FIG. 3A is illustrative of the format of data storage on a CD used in this embodiment of the invention. This format is mainly applicable to CDs containing game software that is used in domestic TV game machines. A game program and game data are stored in a CD-ROM format that can be read by a computer on inner tracks 270 of this CD. Outer tracks 260 of the CD contain sound data and synchronization data in CD-ROMXA format.

Figure 3B:
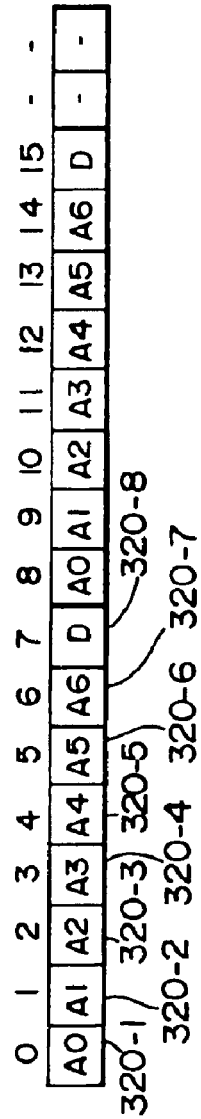

The outer tracks of the CD 250 of FIG. 3A comprise a plurality of sectors of data 320-1, 320-2, . . . , as shown in FIG. 3B, where the CD-ROMXA configuration is such that eight channels of sound can be stored thereon.

In this case, the tune data is divided into sector units for storage, where eight channels of data are sequentially read during tune reproduction, then one channel of data is reproduced. In this embodiment of the invention, one channel out of eight channels is allocated to a data channel.

Figure 4:
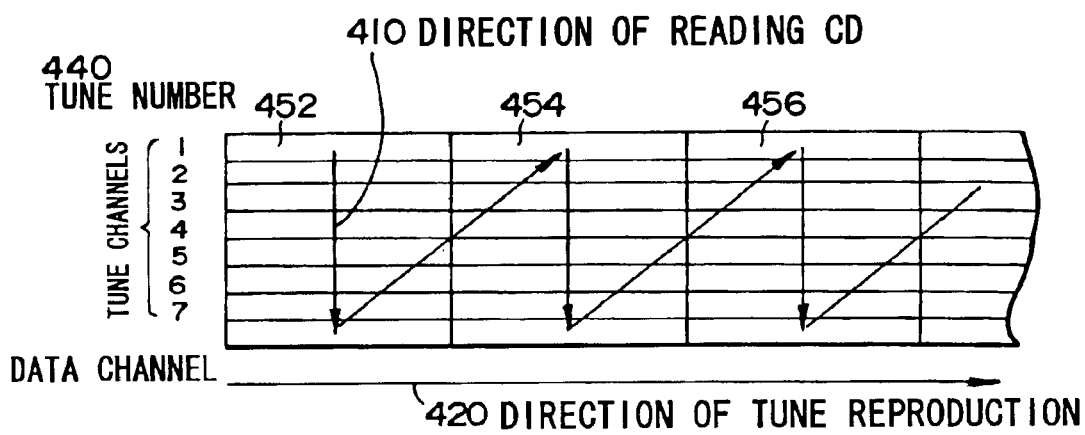
FIG. 4 is a view schematically showing the recording format of data on a CD-ROMXA.

The data storage format used with CD-ROMXA is shown schematically in FIG. 4. In this figure, seven out of eight channels are tune channels and one channel is a data channel. Reference number 410 denotes the direction of reading of the CD. The configuration is such that eight sectors, which are sectors for eight channels, can be read simultaneously at least once. Reference number 420 denotes the direction of reproduction. When tune number 1 is being reproduced, by way of example, sound data stored in the sectors 452, 454, and 456 are read in that sequence for reproduction.

The description now turns to an example of an embodiment that obtains synchronization between tunes and images, using the method of the present invention.

Figure 5:
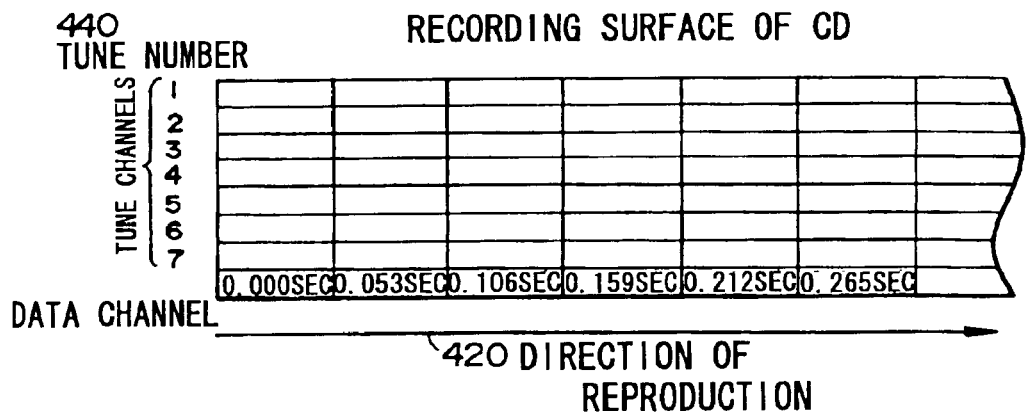
FIG. 5 is illustrative of processing that is executed when elapsed time since the start of a tune has been stored in the data channel.

In this embodiment of the invention, elapsed time since the start of a tune is synchronized with images stored in the data channel. An illustration of the processing that is executed when elapsed time since the start of a tune has been stored in the data channel is shown in FIG. 5.

It is possible to calculate the elapsed time since the start of the tune from the speed at which data is read from the recording medium. With a CD, 300 kilobytes of data are read within one second. This means that 150 sectors of data are read in one second. Therefore, the time required for reading eight channels of data is given by the following formula:

1(second)÷150(sector)×8(sector)=0.0533. . . (seconds)

In other words, the time taken to read eight channels of data is 0.0533 seconds. Therefore, it is possible to store data that represents elapsed time since the start of a tune, by storing marks indicating sequential increments of 0.053 seconds in the data channel, as shown in FIG. 5.

The description now turns to an example of the reading of the synchronization simultaneously with the tune and the switching of images at tune delimiters every ten seconds.

An illustrative view of display images that are displayed at tune delimiters every ten seconds is shown in FIG. 6. Assume that a display image 510-1 is displayed within ten seconds from the start of the tune, 510-2 is displayed from ten seconds to less than 20 seconds, 510-3 is displayed from 20 seconds to less than 30 seconds, and 510-4 is displayed from 30 seconds to less than 40 seconds. Assume that the display images 510-1, 510-2, 510-3, and 510-4 have image numbers 0, 1, 2, and 3, respectively.

Figure 7:
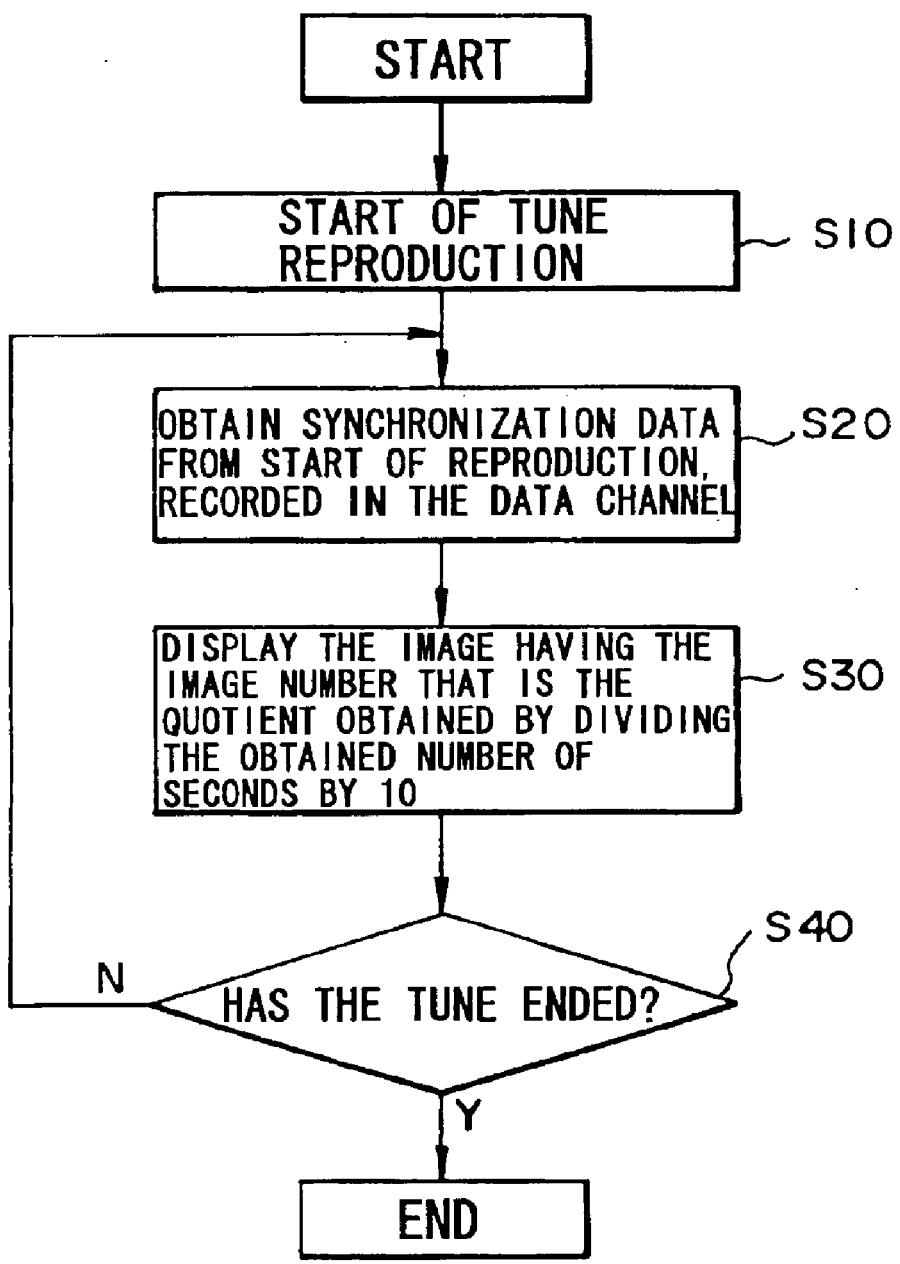
FIG. 7 is a flowchart of the operation of switching the display images of FIG. 6 at tune delimiters every ten seconds.

A flowchart of the operation of switching the display images of FIG. 6 at the tune delimiters every ten seconds is shown in FIG. 7.

When tune reproduction starts, the synchronization data, which was stored in the data channel that was read simultaneously with the accessing of the tune, is obtained (steps S10 and S20). The number of seconds of the obtained synchronization data is divided by ten, and the image corresponding to the image number of the value of the thus-obtained quotient is displayed on the screen (step S30). When the thus-obtained quotient is 0, for example, 510-1 is displayed; when it is 1, 510-2 is displayed; when it is 2, 510-3 is displayed, and when it is 3, 510-4 is displayed. The processing of steps S20 and S30 is repeated until the tune ends (step S40).

The synchronization data that was read simultaneously with the tune always corresponds to the position of the tune to be reproduced next. This means that, if sound skipping does occur during this process, the synchronization that was read in simultaneously with the tune corresponds to the position of the tune to be reproduced, after the sound skipping has occurred. Thus the present invention makes it possible to switch images with accurate synchronization with tunes, even if sound skipping or the like occurs during reproduction.

Note that the data recorded in the data channel is not particularly limited and thus it could equally well be image information such as a counter or image color matched to the beat of a tune, the shape of a physical object when it is displayed in three dimensions on a screen, or positional information of a physical camera. In addition, the configuration could equally well be such that synchronization data, such as elapsed time since the start of a tune, could be comprised together with other information.

Figure 8:
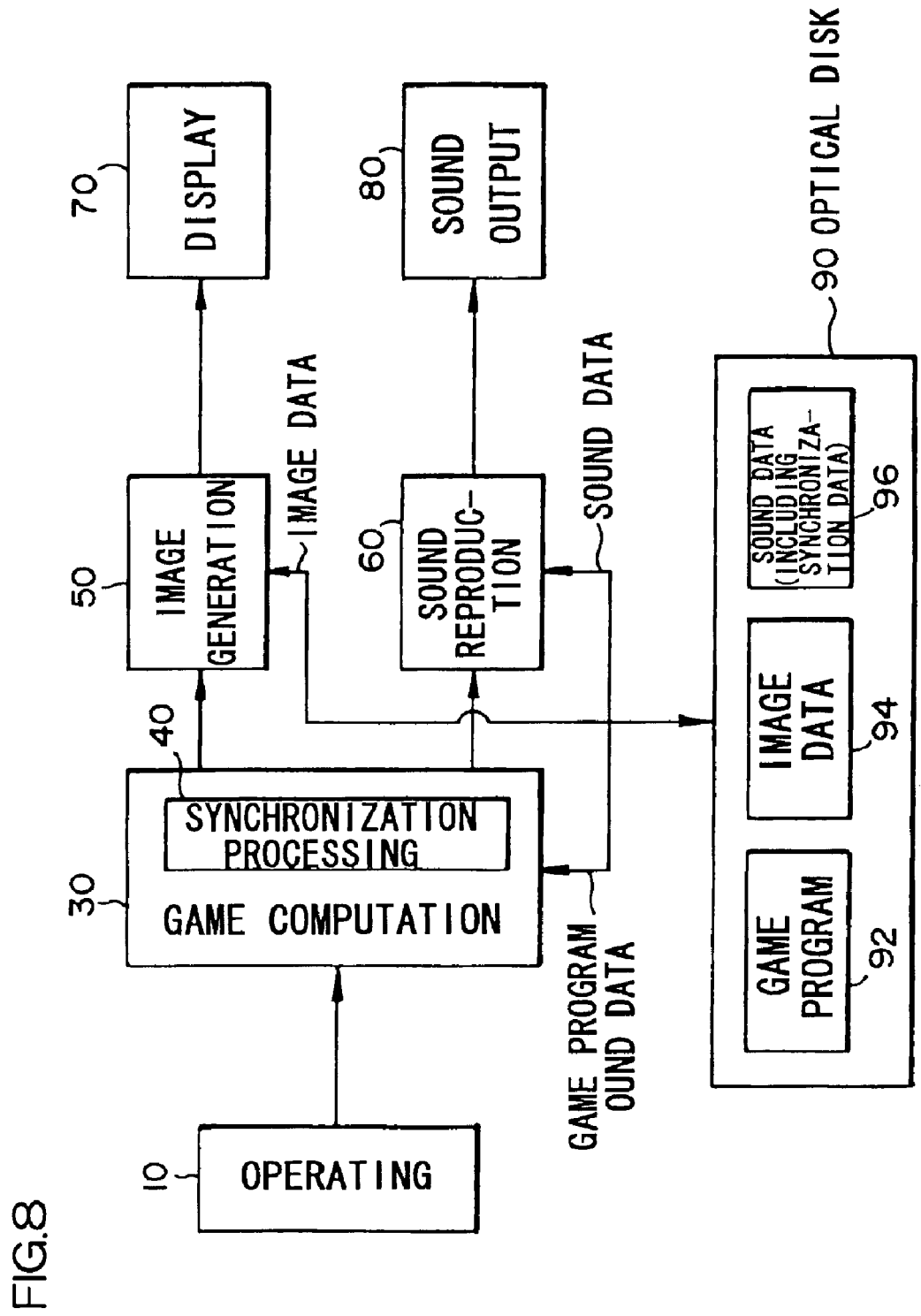
FIG. 8 shows a functional block diagram of a game machine in accordance with this embodiment of the invention.

An example of a functional block diagram of a game machine in accordance with this embodiment of the invention is shown in FIG. 8. In this case, an operating section 10 enables a player to input operating information by operating controls such as a joystick, buttons, a steering wheel, or an accelerator, and operation information that is obtained by the operating section 10 is input to a game computation section 30.

An optical disk 90 stores a game program 92, image data 94 such as object information used in image generation, and sound data 96 for reproducing game sounds.

The game computation section 30 performs processing such as for game execution, setting various game modes, sending reproduction instructions to a sound reproduction section 60, and supplying information necessary for image generation to a image generation section 50, based on various types of information such as the above described operation information, the game program 92, and sound data 96 stored on the optical disk 90. The functions thereof can be implemented by hardware such as the CPU or memory.

The image generation section 50 generates the game images, based on the processing results of the game computation section 30 and the image data 94 that is stored on the optical disk, and the functions thereof can be implemented by an image generation IC (a dedicated IC, CPU, or DSP), and it can be implemented by hardware such as memory. Images generated by the image generation section 50 are displayed on a display section 70.

The sound reproduction section 60 generates game sounds (game music, effect sounds, voices, etc.) based on the processing results of the game computation section 30, and the functions thereof can be implemented by hardware such as a sound processing IC, an ADPCM decoder, a D/A converter, a low-pass filter, and memory. Game sounds reproduced by the sound reproduction section 60 are output by a sound output section 80.

The game computation section comprises a synchronization processing section 40. The synchronization processing section 40 performs processing to obtain synchronization of generated images with the game sounds when the sound data is being reproduced, based on the synchronization data that is recorded within the sound data.

In this embodiment of the invention, when the game computation section 30 instructs the reproduction of predetermined sound data that is recorded on the optical disk, based on the game state, the sound data 96 that has been read from the optical disk 90 is reproduced by the sound reproduction section 60 and is output to the sound output section 80.

During this time, the synchronization processing section 40 performs processing such as that described by way of example with reference to FIG. 7, based on the synchronization data that was read together with the sound data, then instructs the timing of image switching and images to be created by the image generation section 50. Since the images are generated on the basis of these instructions from the synchronization processing section 40, it is possible to reproduce images in synchronization with the reproduced sounds.

Figure 9:
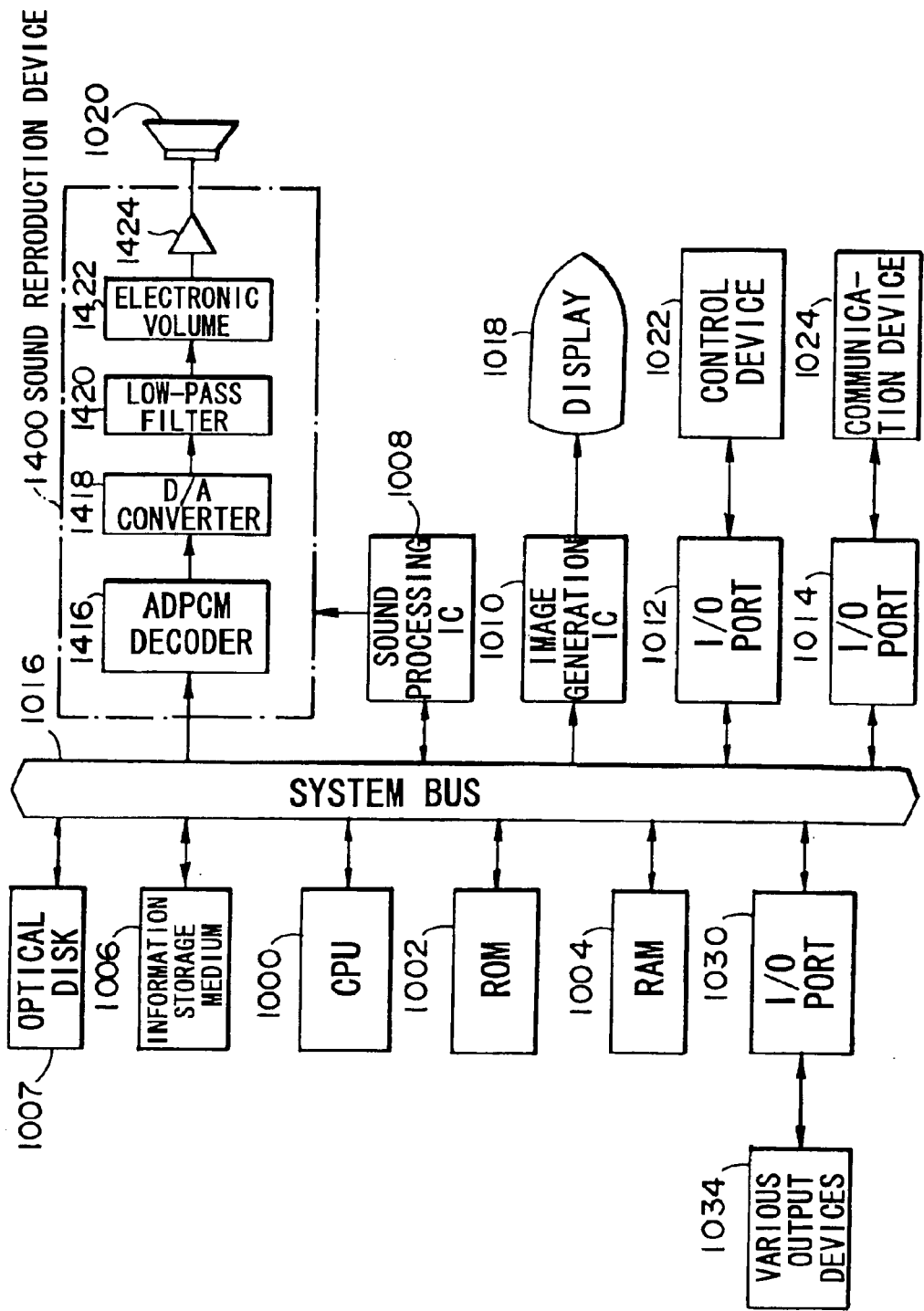
FIG. 9 shows an example of a structure of hardware that can implement this embodiment.

The description now turns to an example of hardware for a game machine that can implement this embodiment of the invention, with reference to FIG. 9. In the game machine shown in this figure, a CPU 1000, ROM 1002, RAM 1004, an information storage medium 1006, an optical disk 1007, a sound reproduction device 1400, a sound processing IC 1008, an image generation IC 1010, and I/O ports 1012, 1014, and 1030 are connected together by a system bus 1016 in such a manner that data can be mutually transferred therebetween. A display 1018 is connected to the image generation IC 1010, a speaker 1020 is connected to the sound reproduction device 1400, a control device 1022 is connected to the I/O port 1012, a communication device 1024 is connected to the I/O port 1014, and various output devices 1034 are connected to the I/O port 1030.

The information storage medium 1006 is mainly used for storing a game program and image information for representing display objects, where means such as a CD-ROM, game cassette, IC card, magneto-optical device, floppy-disk device, or memory could be used therefor. It should be noted, however, that the sound data or image data, which is recorded together with the synchronization data that is the characteristic point of the present invention, is stored in the optical disk 1007.

The optical disk 1007 contains sound data or image data that is recorded together with the synchronization data that is the characteristic point of the present invention, and it could also contain other data such as a game program, image data, and sound data (tone data, score data, and waveform data). Note that the information storage medium 1006 need not be provided if all the data and the program necessary for the game can be stored within this optical disk alone.

The ROM 1002 contains data such as initialization information for the main game machine.

The control device 1022 is equivalent to a game controller and is an apparatus for inputting to the main game machine the results of decisions made by the player as the game progresses.

The various output devices 1034 are equivalent to a seat or player platform that vibrates in synchronization with sounds and images, for example, or an optical signal output apparatus, and these devices are used for outputting vibrations, resistive forces or the like as the game progresses.

The CPU 1000 controls the entire apparatus and performs various types of processing in accordance with factors such as the game program stored in the optical disk 1007 or the information storage medium 1006, or signals that are input by the control device 1022. The RAM 1004 is a storage means used as a work area of this CPU 1000, and data such as given contents of the optical disk 1007, the information storage medium 1006, or the ROM 1002, or computational results of the CPU 1000 are stored therein.

With this type of game machine, the configuration is such that game sounds and game images provided by the sound processing IC 1008 and the image generation IC 1010 are output as appropriate. The sound processing IC 1008 performs various types of processing for generating game sounds such as game music, effect sounds, and voices, based on instructions from the CPU 1000 and data such as a game program, tone data, and score data from the RAM 1004, the information storage medium 1006, and the optical disk 1007. The thus generated game sounds are output by the speaker 1020, via other components such as the sound reproduction device 1400.

The sound reproduction device 1400 comprises an ADPCM decoder 1416, an D/A converter 1418, a low-pass filter 1420, and an electronic volume 1422.

The ADPCM decoder 1416 generates digital sound signals that are to be output, based on the processing results of the sound processing IC 1008 and waveform data (data representing the actual physical waveforms of sounds made by instruments such as a drum or piano) from the optical disk 1007 or the like, and outputs them to the D/A converter 1418. The D/A converter 1418 converts these digital signals to analog signals and outputs them to the low-pass filter 1420. The output of the low-pass filter 1420 is then input to the electronic volume 1422. The electronic volume 1422 adjusts the magnitude of the sound in accordance with instructions from the sound processing IC 1008. The output of the electronic volume 1422 is input through an amplifier 1424 to the speaker 1020, which outputs sounds such as game music, effect sounds, and voices to the exterior.

The image generation IC 1010 is an integrated circuit that synthesizes pixel information for output to the display 1018, based on image information sent from components such as the RAM 1004, the ROM 1002, the information storage medium 1006, and the optical disk 1007. Note that a device called a head-mounted display (HMD) could also be used as the display 1018.

The communication device 1024 exchanges various items of information used within the interior of the game machine, to and from the exterior, and it can be used to transfer given information to and from another game machine connected thereto, in accordance with a game program, or to transfer information such as a game program over a communication line.

The processing described with reference to FIGS. 1 to 8 is implemented by components such as the optical information storage medium 1006 storing a game program, the CPU 1000 that operates in accordance with that game program, and the image generation IC 1010. Note that processing performed by the image generation IC 1010 and the sound processing IC 1008 could also be done in a software manner by the CPU 1000 or an ordinary DSP.

Figure 10A:
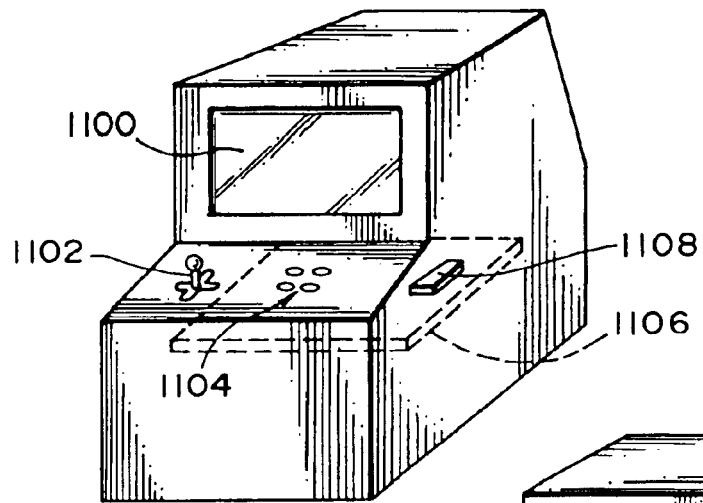
FIGS. 10A, 10B, and 10C show various different forms of machines to which the present invention can be applied.

An example of this embodiment of the invention applied to an arcade game machine is shown in FIG. 10A. A player enjoys the game by operating controls such as a joystick 1102 and buttons 1104 while viewing a game image shown on a display 1100. Components such as a CPU, an image generation IC, and a sound processing IC are mounted on an IC board 1106 incorporated into the game machine. Information for playing the game and information for synchronizing game sounds or the like with game images or the like are stored in memory 1108, which is an information storage medium on the IC board. These types of information are hereinafter called stored information. This stored information comprises at least one type of information, such as program coding for executing the above described processing, image information, shape information for display objects, table data, or player information. Sound data comprising synchronization data is stored on optical disk (not shown in the figures), and various types of processing for synchronization with game sounds are performed on the basis of this sound data and the stored information.

Figure 10B:
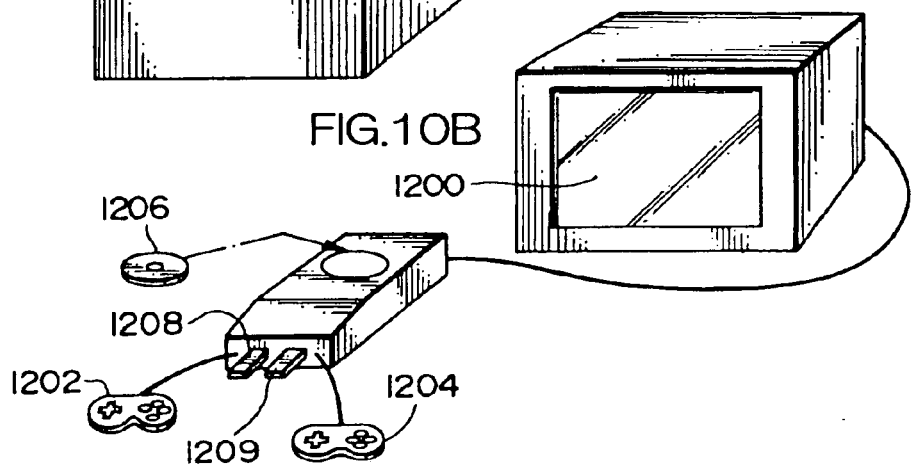

An example of this embodiment applied to a domestic game machine is shown in FIG. 10B. Players enjoy the game by operating game controllers 1202 and 1204 while viewing a game image shown on a display 1200. In this case, sound data that comprises the above described stored information and synchronization data is stored in a CD-ROM 1206, which is an information storage medium that can be freely inserted into and removed from the main unit.

Figure 10C:
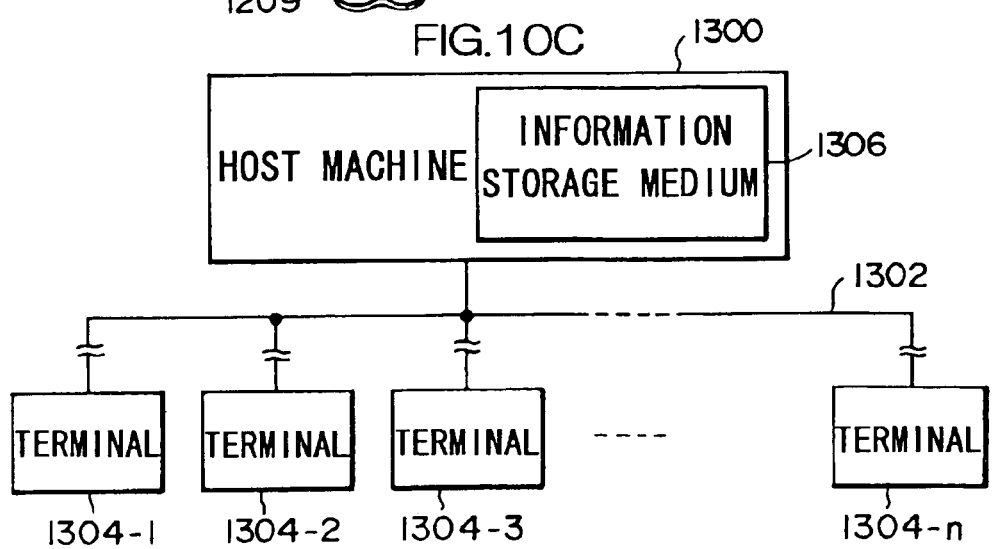

An example of this embodiment applied to a game machine is shown in FIG. 10C where the game machine comprises a host machine 1300 and terminals 1304-1 to 1304-n connected to the host machine 1300 by communication lines 1302. In this case, the above described stored information is stored in an information storage medium 1306 such as a magnetic disk device, magnetic tape device, or memory that can be controlled by the host machine 1300. Each of the terminals 1304-1 to 1304-n has a CPU, an image generation IC, and a sound processing IC. In addition, if game images and sounds can be synthesized by the terminals 1304-1 to 1304-n in a stand-alone manner, means such as a game program for synthesizing game images and sounds is transferred thereto from the host machine 1300. In this case, the sound data comprising synchronization data could be stored on an optical disk or the like which is provided on the terminal side. If game images and sounds cannot be synthesized thereby, on the other hand, the host machine 1300 could synthesize the game images and sounds and output them to a terminal for transfer to the terminals 1304-1 to 1304-n. In that case, the sound data comprising synchronization data could be stored on an optical disk or the like which is provided on the host side.

Note that the present invention is not limited to the above described embodiment and thus it can be modified in various ways.

This embodiment was described as relating to an example in which images are synchronized with game music that is stored on compact disk, but the invention is not limited thereto.

It is also not limited to something stored on compact disk; it could equally well concern something stored on any other kind of optical disk, such as an LD, MD, or DVD. It is similarly not limited to game music; it can also be applied to other sounds or movie data for moving images.

The above embodiment was further described as relating to an example of generating images in synchronization with tunes, but the items to be output in synchronization are not limited to images. For example, vibration or resistive forces could be output to the controller that is operated by the player. Furthermore, a seat on which a player sits or a platform that models skis or the like, on which the player rides, could be made to vibrate in synchronization with musical tone data or images stored on optical disk. Alternatively, optical signals could be output in synchronization with tunes or images.

Furthermore, the above embodiment was described with reference to an example in which tunes and images were synchronized accurately without any slippage, even if sound skipping has occurred. However, the present invention is not limited thereto. Synchronization may also be recovered after a temporary slippage between images and tunes has occurred, by way of example. With prior-art methods, it is not possible for the game program to detect sound skipping or like that occurs during reproduction, so it is difficult to recover when a temporary slippage has occurred. The present invention, however, makes it possible to recover synchronization rapidly, even if a temporary slippage should occur.

This embodiment of the invention was also described above with reference to an example in which synchronization data is data indicating the elapsed time from the start of a tune, but the present invention is not limited thereto and thus it could be data indicating a tune position or delimiter, timing data determined in accordance with the rhythm, tempo, or beat of the tune, or counter data, by way of example.

In addition, the present invention can be applied to various game machines such as domestic game machines, arcade game machines, simulators, large-scale attractions in which many players can participate, and personal computers.

The present invention is also not limited to game machines; it can also be applied to karaoke devices or the like.

If background images and effect sounds are output in synchronization with musical accompaniment sounds that are recorded on optical disk, by way of example, it is possible to provide a karaoke device that can output background images and effect sounds in synchronization with those musical accompaniment sounds, even if sound skipping occurs therein.

What is claimed is:

1. A game machine comprising:
    an optical disk in which is included synchronization data for synchronizing with at least one of sound data and image data, within at least one of the sound data and image data, wherein the sound and/or image data includes delimiters spaced at regular intervals;
    reproduction means for reproducing at least one of a sound and an image, based on at least one of the sound data and the image data accessed from the optical disk; and
    processing means for executing given processing in synchronization with at least one of sounds and images to be reproduced by reproduction means, based on synchronization data accessed from the optical disk, including switching a displayed image when synchronization data indicates that a sound delimiter is read and/or switching a sound when synchronization data indicates that a video delimiter is read, to avoid slippage between sound and image data.

2. The game machine as defined in claim 1, wherein at least one item of the synchronization data is included within a range of data that is capable of being accessed simultaneously.

3. The game machine as defined in claim 1,
wherein the synchronization data comprises data indicating at least one of elapsed time since reproduction start during normal reproduction and elapsed time from a predetermined position.

4. The game machine as defined in claim 2,
wherein the synchronization data comprises data indicating at least one of elapsed time since reproduction start during normal reproduction and elapsed time from a predetermined position.

5. The game machine as defined in claim 1, further comprising a display section for displaying a game image wherein the processing means performs image generation processing on a game image to be displayed on the display section, in synchronization with at least one of a sound and an image reproduced by the reproduction means, based on synchronization data of the optical disk.

6. The game machine as defined in claim 4, further comprising a display section for displaying a game image wherein the processing means performs image generation processing on a game image to be displayed on the display section, in synchronization with at least one of a sound and an image reproduced by the reproduction means, based on synchronization data of the optical disk.

7. The game machine as defined in claim 1, further comprising a game controller for inputting an operation by a player,
wherein the processing means performs processing for output to the game controller, in synchronization with at least one of a sound and an image reproduced by the reproduction means, based on synchronization data of the optical disk.

8. The game machine as defined in claim 4, further comprising a game controller for inputting an operation by a player,
wherein the processing means performs processing for output to the game controller, in synchronization with at least one of a sound and an image reproduced by the reproduction means, based on synchronization data of the optical disk.

9. The game machine as defined in claim 1, further comprising at least one of a player platform on which a player rides and a seat on which a player sits,
wherein the processing means performs processing for output to at least one of the player platform and the seat, in synchronization with at least one of a sound and an image reproduced by the reproduction means, based on synchronization data of the optical disk.

10. The game machine as defined in claim 4, further comprising at least one of a player platform on which a player rides and a seat on which a player sits,
wherein the processing means performs processing for output to at least one of the player platform and the seat, in synchronization with at least one of a sound and an image reproduced by the reproduction means, based on synchronization data of the optical disk.

11. The game machine as defined in claim 1, further comprising an optical signal output section,
wherein the processing means performs processing for output an optical signal to the optical signal output section, in synchronization with at least one of a sound and an image reproduced by the reproduction means, based on synchronization data of the optical disk.

12. The game machine as defined in claim 4, further comprising an optical signal output section,
wherein the processing means performs processing for output an optical signal to the optical signal output section, in synchronization with at least one of a sound and an image reproduced by the reproduction means, based on synchronization data of the optical disk.

13. An information storage medium for reading data from an optical disk in which is included synchronization data for synchronizing with at least one of sound data and image data, within at least one of the sound data and image data, wherein the sound and/or image data includes delimiters spaced at regular intervals, and performing given processing, the information storage medium comprising:
information for reproducing at least one of a sound and an image, based on at least one of the sound data and the image data accessed from the optical disk; and
information for executing given processing in synchronization with at least one of sounds and images to be reproduced by reproduction means, based on synchronization data accessed from the optical disk, for switching a displayed image when synchronization data indicates that a sound delimiter is read, and/or for switching a sound when synchronization data indicates that a video delimiter is read, to avoid slippage between sound and image data.

14. The information storage medium as defined in claim 13, wherein at least one item of the synchronization data is included within a range of data that is capable of being accessed simultaneously.

15. The information storage medium as defined in claim 13,
wherein the synchronization data comprises data indicating at least one of elapsed time since reproduction start during normal reproduction and elapsed time from a predetermined position.

16. A musical tone reproduction device comprising:
an optical disk in which is included synchronization data for synchronizing with sound data, within the sound data, wherein the sound data includes delimiters spaced at regular intervals;
image data storage means in which is included image data that includes delimiters spaced at regular intervals;
reproduction means for reproducing a tune, based on the sound data accessed from the optical disk; and
image reproduction means for synchronizing with the tune to be reproduced based on the synchronization data accessed from the optical disk, and for performing reproduction processing on an image that is stored in the image data storage means, when the synchronization data indicates that a sound delimiter is read including when slippage has occurred between sound and image data, and for performing reproduction processing on an image that is stored in the image data storage means.

17. The musical tone reproduction device as defined in claim 16,
wherein at least one item of the synchronization data is included within a range of data that is capable of being accessed simultaneously.

18. The musical tone reproduction device as defined in claim 16, wherein the synchronization data comprises data indicating at least one of elapsed time since reproduction start during normal reproduction and elapsed time from a predetermined position.

19. An information storage medium for reading data from an optical disk in which is comprised synchronization data for synchronizing with sound data, within the sound data, and performing given processing, wherein the sound and/or image data includes delimiters spaced at regular intervals, and performing given processing, the information storage medium comprising:

information for reproducing a tune, based on the sound data accessed from the optical disk; and information for synchronizing with a tune to be reproduced by the reproduction means, based on the synchronization data accessed from the optical disk, and performing image reproduction processing for switching a displayed image when synchronization data indicates that a sound delimiter is read, and/or for switching a sound when synchronization data indicates that a video delimiter is read, to avoid slippage between sound and image data.

20. The information storage medium as defined in claim 19, wherein at least one item of the synchronization data is included within a range of data that is capable of being accessed simultaneously.

21. The information storage medium as defined in claim 19, wherein the synchronization data comprises data indicating at least one of elapsed time since reproduction start during normal reproduction and elapsed time from a predetermined position.

22. A method for reading data from an optical disk in which is included synchronization data for synchronizing with at least one of sound data and image data, within at least one of the sound data and image data, wherein the sound and/or image data includes delimiters spaced at regular intervals, the method comprising steps of:

reproducing at least one of a sound and an image, based on at least one of the sound data and the image data accessed from the optical disk;

executing given processing in synchronization with at least one of sounds and images to be reproduced by reproduction means, based on synchronization data accessed from the optical disk; and switching a displayed image when synchronization data indicates that a sound delimiter is read, and/or for switching a sound when synchronization data indicates that a video delimiter is read, to avoid slippage between sound and image data.

23. The method for reading data from an optical disk as defined in claim 22, wherein at least one item of the synchronization data is included within a range of data that is capable of being accessed simultaneously.

24. The method as defined in claim 22, wherein the synchronization data comprises data indicating at least one of elapsed time since reproduction start during normal reproduction and elapsed time from a predetermined position.

25. The method as defined in claim 23, wherein the synchronization data comprises data indicating at least one of elapsed time since reproduction start during normal reproduction and elapsed time from a predetermined position.

26. The method as defined in claim 22, wherein the given processing comprises image generation processing on a game image to be displayed on a display section, in synchronization with at least one of a sound and an image reproduced by the reproduction means, based on synchronization data of the optical disk.

27. The method as defined in claim 25, wherein the given processing comprises image generation processing on a game image to be displayed on a display section, in synchronization with at least one of a sound and an image reproduced by the reproduction means, based on synchronization data of the optical disk.

28. The method as defined in claim 22, wherein the given processing comprises processing for output to a controller for inputting an operation by a player, in synchronization with at least one of a sound and an image reproduced by the reproduction means, based on synchronization data of the optical disk.

29. The method as defined in claim 25, wherein the given processing comprises processing for output to a controller for inputting an operation by a player, in synchronization with at least one of a sound and an image reproduced by the reproduction means, based on synchronization data of the optical disk.

30. The method as defined in claim 22, wherein the given processing comprises processing for output to at least one of the player platform on which a player rides and a seat on which a player sits and the seat, in synchronization with at least one of a sound and an image reproduced by the reproduction means, based on synchronization data of the optical disk.

31. The method as defined in claim 25, wherein the given processing comprises processing for output to at least one of the player platform on which a player rides and a seat on which a player sits and the seat, in synchronization with at least one of a sound and an image reproduced by the reproduction means, based on synchronization data of the optical disk.

32. The method as defined in claim 22, wherein the given processing comprises processing for output an optical signal to an optical signal output section, in synchronization with at least one of a sound and an image reproduced by the reproduction means, based on synchronization data of the optical disk.

33. The method as defined in claim 25, wherein the given processing comprises processing for output an optical signal to an optical signal output section, in synchronization with at least one of a sound and the image reproduced by the reproduction means, based on synchronization data of the optical disk.

34. The game machine of claim 1, wherein the range of data is sound data regarding a tune and the synchronization data capable of being read simultaneously therewith corresponds to a position of a next to be reproduced tune.

35. The method of claim 22, wherein the range of data is sound data regarding a tune and the synchronization data capable of being read simultaneously therewith corresponds to a position of a next to be reproduced tune.

* * * * *